(12) United States Patent
Friour et al.

(10) Patent No.: US 8,313,808 B2
(45) Date of Patent: Nov. 20, 2012

(54) COMPOSITE MATERIALS FROM CHARGED OR FUNCTIONALIZED LATEXES FOR INKJET APPLICATIONS

(75) Inventors: Gerard A. Friour, Chalon sur Saone (FR); Stephanie V. Desrousseaux, Cambridge (GB); Olivier J. Poncelet, Chalon-sur-Saone (FR)

(73) Assignee: Eastman Kodak Company, Rochester, NY (US)

( * ) Notice: Subject to any disclaimer, the term of this patent is extended or adjusted under 35 U.S.C. 154(b) by 601 days.

(21) Appl. No.: 12/517,288

(22) PCT Filed: Dec. 19, 2007

(86) PCT No.: PCT/GB2007/004888
§ 371 (c)(1),
(2), (4) Date: Jun. 2, 2009

(87) PCT Pub. No.: WO2008/075047
PCT Pub. Date: Jun. 26, 2008

(65) Prior Publication Data
US 2010/0075042 A1    Mar. 25, 2010

(30) Foreign Application Priority Data
Dec. 21, 2006   (GB) .................................. 0625524.4

(51) Int. Cl.
*B41M 5/52* (2006.01)
*C04B 20/10* (2006.01)
*C08K 3/34* (2006.01)

(52) U.S. Cl. ....... 427/288; 427/212; 427/256; 428/32.1; 428/32.24; 428/32.25; 428/32.26; 428/32.34; 428/32.35; 428/32.36; 428/32.37; 428/32.38; 523/201; 523/204; 523/210; 347/101; 347/105

(58) Field of Classification Search ....................... None
See application file for complete search history.

(56) References Cited

U.S. PATENT DOCUMENTS

| | | | |
|---|---|---|---|
| 6,457,824 B1 * | 10/2002 | Wexler | 347/105 |
| 6,475,603 B1 | 11/2002 | Wexler | |
| 6,726,991 B2 | 4/2004 | Kaeding et al. | |
| 2003/0021983 A1 * | 1/2003 | Nohr et al. | 428/327 |
| 2003/0044612 A1 * | 3/2003 | Kaeding et al. | 428/407 |
| 2005/0014000 A1 * | 1/2005 | Bringley et al. | 428/403 |

FOREIGN PATENT DOCUMENTS
WO    2005/009747    2/2005

OTHER PUBLICATIONS

Caruso et al., "Electrostatic Self-Assembly of Silica Nanoparticle-Polyelectrolyte Multilayers on Polystyrene Latex Particles", Journal of American Chemical Society, vol. 120, (1998), pp. 8523-8524.*

* cited by examiner

*Primary Examiner* — Nathan Empie
*Assistant Examiner* — Lisha Jiang
(74) *Attorney, Agent, or Firm* — Andrew J. Anderson

(57) ABSTRACT

An inkjet receiver comprising a support and one or more layers coated on the support, at least one of which comprises a particulate material and a binder, the particulate material comprising composite particles having an inner portion and an outer portion or core-shell arrangement, wherein the inner portion comprises a negatively-charged, positively-charged or functionalized latex, and the outer portion comprises an inorganic material having enhanced keeping properties and reduced ozone-induced dye fade.

12 Claims, 4 Drawing Sheets

COMPOSITE MATERIALS FROM CHARGED OR FUNCTIONALIZED LATEXES FOR INKJET APPLICATIONS

FIELD OF THE INVENTION

The invention relates to an inkjet receiver comprising composite particles based on charged or functionalized latex particles providing a core and metal oxides providing a shell. More specifically, the invention relates to an inkjet recording material with excellent printed color density, image quality and resistance to fading from exposure to ozone.

BACKGROUND OF THE INVENTION

In a typical inkjet recording or printing system ink droplets are ejected from a nozzle at high speed towards a recording element or medium to produce an image on the medium. The ink droplets, or recording liquid, generally comprise a recording agent such as a dye or pigment and a large amount of solvent. The solvent or carrier liquid typically is made up of an aqueous mixture, for example, comprising water and one or more organic materials, such as a monohydric alcohol, a polyhydric alcohol or the like.

An inkjet receiver or recording element typically comprises a support having on at least one surface thereof at least one ink-receiving layer. There are generally two types of ink-receiving layers. The first type of ink-receiving layer comprises a non-porous coating of a polymer with a high capacity for swelling, the non-porous coating absorbing ink by molecular diffusion. Cationic or anionic substances may be added to the coating to serve as a dye-fixing agent or mordant for a cationic or anionic dye. Typically, the support is a smooth resin-coated paper and the coating is optically transparent and very smooth, leading to a very high gloss "photo-grade" inkjet recording element. The swellable binder forms a barrier to air-borne pollutants that may degrade the image dye over time. However, this type of ink-receiving layer usually tends to absorb the ink slowly and consequently the imaged receiver or print is not instantaneously dry to the touch.

The second type of ink-receiving layer comprises a porous coating of inorganic, polymeric or organic-inorganic composite particles, a polymeric binder and optional additives, such as dye-fixing agents or mordants. These particles can vary in chemical composition, size, shape, and intra-particle porosity. In this case, the printing liquid is absorbed into the open interconnected pores of the ink-receiving layers substantially by capillary action to obtain a print that is instantaneously dry to the touch. Typically the total interconnected inter-particle pore volume of porous media, which may include one or more layers, is more than sufficient to hold all the applied ink forming the image. Image dyes adsorbed to the porous particles are exposed to air and may fade unacceptably in a short time.

Bringley et al., in WO-A-2005/009747, describe porous inkjet media containing core/shell particles wherein the shell of the particles is an oligomeric or polymeric aluminosilicate complex or aluminosilicate particulate and the preferred core materials are those with a negative surface charge, such as silica. The resistance to fading of image dyes printed on the medium is improved compared with standard particles of silica or alumina. Such particles exhibit a relatively high density, so considerable weight is required for an ink-receptive layer.

Wexler, in U.S. Pat. No. 6,475,603, discloses an inkjet recording element comprising a porous uppermost layer containing core-shell particles, wherein the core is a thermoplastic polymer and the shell comprises a shell of inorganic colloidal particles, preferably colloidal alumina or colloidal silica. Preferred polymeric core materials include polyester, acrylic polymer and polystyrene. The receiver is intended for fusing after printing to form a film sealing the material. Improved gloss and reduction of cracking were observed. Improvement in dye stabilization properties was not reported.

Kaeding, et al., in U.S. Pat. No. 6,726,991, disclose core/shell particles comprising a core of porous polymer and a shell of inorganic colloid having a median diameter of less than about 70 nm. The inorganic colloid particles are selected from silica, alumina, alumina-silica and the like. The preparation method provides small particle size, narrow size distribution without organic emulsifiers. Crosslinking monomers provide particle porosity for applications such as controlled release of pharmaceutical agents. Improvement in dye stabilization properties of inkjet receivers was not reported.

PROBLEM TO BE SOLVED BY THE INVENTION

There remains an unfilled need for porous inkjet receiving media providing high density and excellent image quality, that are dry to the touch immediately after printing and resist fading when exposed to atmospheric pollutants, even without a fusing or sealing step in the printing process.

It is therefore an object of the present invention to provide inkjet recording media that simultaneously provide high ink capacity and excellent image stability.

It is a further object of the invention to provide a particulate material for use in an appropriate layer of an inkjet receiver to provide these desirable properties.

It is yet a further object of this invention to provide a method of printing employing the inkjet recording media according to the present invention.

SUMMARY OF THE INVENTION

According to a first aspect of the present invention, there is provided an inkjet receiver comprising a support and one or more layers coated on the support, at least one of which comprises a particulate material and a binder, the particulate material comprising composite particles having an inner portion and an outer portion, wherein the inner portion comprises an organic polymer material comprising latex particles selected from a negatively-charged, positively-charged and a functionalized latex, and the outer portion comprises an inorganic material having enhanced keeping properties.

In a second aspect of the invention, there is provided a coating composition for forming an ink-receiving layer on an inkjet receiver, the composition comprising a dispersion of a particulate material as defined above and a binder in a coating medium.

In a third aspect of the invention, there is provided a method of manufacturing an inkjet receiver, the method comprising providing a support and coating at least one layer of a coating composition as defined above and a binder onto the support and drying the coated support.

In a fourth aspect of the invention, there is provided a method of printing, which comprises the steps of: (a) providing an inkjet printer that is responsive to digital data signals; (b) loading the inkjet printer with the inkjet receiver described above; (c) loading the inkjet printer with a inkjet ink; and (d) printing on the inkjet receiver using the inkjet ink in response to digital data signals.

ADVANTAGEOUS EFFECT OF THE INVENTION

The particulate material for use in the present invention is capable of providing an ink-receiving layer of an inkjet receiver that is porous, has good dry time and image quality whilst being less dense than a pure inorganic particulate material of the prior art of similar coatability. Inkjet receivers including layers comprising such composite particles enable these benefits in addition to improved keeping and enhanced resistance to ozone-induced image fading.

BRIEF DESCRIPTION OF THE DRAWINGS

The above and other objects, features, and advantages of the present invention will become more apparent when taken in conjunction with the following description and drawings wherein.

DETAILED DESCRIPTION OF THE INVENTION

Figure 1:
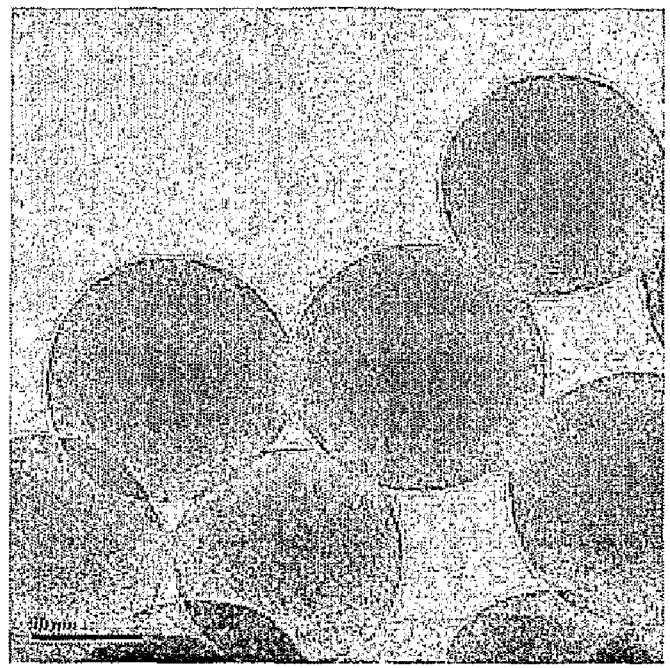
FIG. 1 is a transmission electron micrograph of particles of the comparative latex dispersion N at 300× magnification.

As indicated above, the present invention relates to the provision of a porous inkjet receiver, or recording element, which has excellent image quality, rapid dry time and enhanced image-keeping properties, which comprises one or more ink-receiving layers comprising a particulate material comprising composite particles having an inner portion and an outer portion, wherein the inner portion comprises an organic polymer material comprising latex particles selected from a negatively-charged, positively-charged and a functionalized latex, and the outer portion comprises an inorganic material having enhanced keeping properties.

Whilst a particulate material having composite particles is described, the composite particles, which have an inner portion and an outer portion, comprising an organic latex polymer and an image-keeping enhancing inorganic material respectively, are preferably provided as core-shell particles.

The core-shell particles comprise a core, which comprises an organic latex polymer comprising particles selected from a negatively-charged, positively-charged and a functionalized latex and the shell comprises an inorganic material capable of enhancing image-keeping in an inkjet receiver. The core may be a discrete organic polymer particle or agglomeration of such particles and the shell of the particles may be formed onto a discrete particle with an agglomeration of discrete inorganic material particles or "grown" onto an organic polymer core. The core and shell may be adjacent to one another or may have intermediate layers, but are preferably adjacent. Preferably, the core and shell form a two-part particle, optionally with a thin outer overcoat.

The terms "inner" and "outer" used with reference to portions of the composite particles of the invention are intended to differentiate an inner portion of a particle from an outer portion of a particle. The respective size of the portions should be defined as the amount of the particle that is predominantly formed of the material from which it was formed, unless otherwise defined in terms of size, thickness, respective weight or means of formation. The inner portions comprise discrete particles or an agglomeration of such particles and outer portions may, but need not, refer to discrete portions of a particle.

The term "porous layer" is used herein to define a layer that is characterized by absorbing applied ink by means of capillary action rather than liquid diffusion. The porosity is based on pores formed by the spacing between particles, although porosity can be affected by the particle to binder ratio. The porosity of a layer may be predicted based on the critical pigment volume concentration (CPVC). An inkjet recording element having one or more porous layers, preferably substantially all layers, over the support can be referred to as a "porous inkjet recording element," even though at least the support is not considered porous.

Particle sizes referred to herein, unless otherwise indicated, are median particle sizes as determined by light scattering measurements of diluted particles dispersed in water, as measured using laser diffraction or photon correlation spectroscopy (PCS) techniques employing NANOTRAC (Microtac Inc.), MALVERN, or CILAS instruments or essentially equivalent means, the information often being provided in the product literature. For particle sizes greater than 0.3 µm, particle measurements are by a Micromeritics SediGraph® 5100 or equivalent means. For particle sizes not more than about 50 nm, particle measurements are by direct methods, transmission electron microscopy (TEM) of a representative sample or equivalent means.

As used herein, the terms "over", "above", "upper", "under", "below", "lower" and the like with respect to layers in inkjet media refer to the order of the layers over the support, but do not necessarily indicate that the layers are immediately adjacent or that there are no intermediate layers.

With regard to the present application, the term "image-receiving layer" is intended to define a layer that is used as a pigment-trapping layer, dye-trapping layer or dye-and-pigment-trapping layer, in which the printed image substantially resides. Preferably, an image-receiving layer comprises a mordant for dye-based inks. In the case of a dye-based ink, the image may optionally reside in more than one image-receiving layer.

With regard to the present application, the term "base layer" (sometimes also referred to as a "sump layer" or "ink-carrier-liquid receptive layer") is used herein to mean a layer under at least one other ink-retaining layer that absorbs a substantial amount of ink-carrier liquid. In use, a substantial amount, preferably most, of the carrier fluid for the ink is received in the base layer. The base layer is not above an image-containing layer and is not itself an image-containing layer. Preferably, the base layer is the ink-retaining layer nearest the support and comprises calcium carbonate.

The term "ink-receptive layer", "ink-receiving layer" or "ink-retaining layer" includes any and all layers above the support that are receptive to an applied ink composition that absorb or trap any part of the one or more ink compositions used to form the image in the inkjet receiver or recording element, including the ink-carrier fluid and/or the colorant, even if later removed by drying. An ink-receptive layer, therefore, can include an image-receiving layer, in which the image is formed by a dye and/or pigment, a base layer or any additional layers, for example between a base layer and a topmost layer of the inkjet receiver or recording element. Typically, all layers above the support are ink-receptive. The support on which ink-receptive layers are coated may also absorb ink-carrier fluid, in which case it is referred to as an ink-absorptive or absorbent layer rather than an ink-receptive layer.

The inner portion or core comprises an organic polymer material comprising latex particles selected from a negatively-charged, positively-charged and a functionalized latex. Thus the material may have surface modifications having negatively- or positively-charged surface substituents or functional groups which form covalent linking groups with the shell material on formation of the particles of the invention by, for example, incorporating charged components during or after polymerization, additional reactive or property-enhancing surface substituents, or the introduction of inorganic components to influence the polymer's mechanical properties. Preferred modifications are surface modifications made during polymerization, such as to alter the charge of the organic polymer particle formed or to enhance its reactivity or interactivity with inorganic particulate materials. The negatively- or positively-charged or functionalized latex polymer materials may be any latexes modified to improve its properties, such as its interaction with an appropriate property-enhancing inorganic material that will form the shell or outer portion of the particles. The latex polymer materials that form the core of the particles may also comprise agglomerations of such latex particles.

The size of the core particles may be varied depending upon the precise application, the relative amount of material to be used in the shell and the properties thereof and the method of forming the core. Typically, however, the size of the core will range from about 0.005 µm to about 10 µm in diameter, preferably from about 0.01 µm to about 1 µm and more preferably from about 0.05 µm to about 0.5 µm. Coated particles having a diameter of from about 75 nm to about 100 nm find useful application in image-receiving layers of inkjet receivers.

The shell, or outer portion, of the particles may be any suitable size to elicit benefit to the particulate material for use in an inkjet receiver. Typically, the shell may comprise from about 0.5% to about 60% by weight relative to the total weight of the particle, preferably from 5% to 50% by weight, more preferably from 10% to 40% by weight and most preferably about 30% by weight of the total weight of the particle.

Latexes bearing positive or negative charges or functionalized substituents integrate or bind with inorganic particles to give composite or preferably core-shell materials having improved properties as inkjet media components.

Among the inorganic particles that may be bound (covalently or non-covalently) to the organic polymer latex, particles or materials which enhance resistance of dyes or pigments to ozone fading are preferred. Examples of such particles include aluminosilicate polymer particles such as those described in WO-A-2004/039724, hybrid aluminosilicate polymer particles such as those described in WO-A-2004/009494, metal organosilicate polymer particulates such as those described in WO-A-2008/075041, amorphous aluminol surface particles and acid-catalyzed silica, as described in WO-A-2006/013024, the disclosures of which are incorporated by reference.

Stacks of particles (e.g. close packed particulate materials) have typically a void volume of 40%. An inkjet printer typically delivers up to 40 ml/m$^2$, which means that this amount must be absorbed by the void volume of the particle stack. So to ensure adequate ink vehicle-trapping, a coat volume of 100 ml of stacked particles/m$^2$, that is a mass M/m$^2$=100×d (where d is the density of particles), should be provided. The higher the density of the coated particles or beads, the higher is the mass per surface unit to coat. This factor correlates strongly with the cost of manufacturing an inkjet receiver.

One advantage of using composite materials built with latex cores is that latex has a low specific gravity of approximately 1.05. Accordingly, an 80/20 core/shell of latex particles/silica will have a density of about 1.3, which is about a third of pure alumina for example. Highly porous and low density fumed silica is difficult to formulate as a coating composition with a high solid content due to an increased viscosity at high solid content. That means that, at equal coating weight and comparable particle size, the coating thickness and the void volume will be higher.

In addition, composite materials, with latex cores, offer a mechanical advantage over other porous inkjet materials, such as high density inorganic particulates. For example, during cutting of inkjet media, thicker, high density-receiving layers (such as those consisting of high density inorganic particulates) are poor at dissipating mechanical stress during cutting, which can result in the growth of cracks from the cut edge. Organic polymer-containing particles, which are more malleable, can help to overcome this difficulty.

Furthermore, composite materials, such as those having a core-shell arrangement, enable more efficient use of active inorganic particulate materials, since there is a greater surface area exposure per unit weight of inorganic material used. The composite particles may also present a slightly different surface and surface property from dyes than a layer of inorganic particles alone (or agglomerated inorganic particles), which may provide a synergistic benefit of having a organic polymer core comprising latex particles selected from a negatively-charged, positively-charged and a functionalized latex and a shell of inorganic particulate material having a beneficial property for inkjet printing.

The organic latex polymer core may be formed from any suitable polymer material. Suitable polymers may be, for example, polymers of acrylic or styrene, derivatives of cellulose, polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as polyesters, including polyethylene terephthalate, polybutylene terephthalate, polyurethanes and polycarbonates.

Polymers from acrylic, polyester or especially styrenic monomers are preferred. Any suitable ethylenically unsaturated monomer or mixture of monomers may be used in making such styrenic polymers, such as styrene, vinyl toluene, p-chlorostyrene, vinylbenzyl chloride or vinylnaphthalene; or acrylic polymers such as methyl acrylate, ethyl acrylate, n-butyl acrylate, n-octyl acrylate, 2-chloroethyl acrylate, phenyl acrylate, methyl chloroacrylate, methyl methacrylate, ethyl methacrylate, butyl methacrylate and mixtures thereof.

Particularly preferred polymerizable monomers for use in the preparation of modified polymers include styrenic and vinyl monomers, such as styrene, methylmethacrylate or butylacrylate. Mixtures of monomers such as styrene, butylacrylate and methylmethacrylate may be polymerized to obtain the desired polymer properties. Most preferably, the organic polymers are polystyrenes.

Composite particulate materials for use in the present invention are typically prepared by forming the inner portion or core organic latex polymer material and then either contacting the organic polymer material with an inorganic particulate material with an optional catalyst in a co-dispersion to form a shell around the core, or contacting the organic polymer core with a metal oxide polymer precursor and a suitable catalyst in a reaction medium to grow a metal oxide polymer onto the core. The composite particles are typically prepared in aqueous media.

The invention will be described hereinafter in terms of three preferred embodiments of the invention. In a first embodiment, the core comprises a negatively-charged organic polymer latex material. In a second embodiment, the core comprises a positively-charged organic polymer latex material. In a third embodiment, the core comprises a functionalized organic polymer latex material.

According to a first embodiment, the core comprises a negatively-charged latex polymer. The negatively-charged latex polymer core is a latex polymer particle or agglomeration of such particles and preferably has modifications on the surface to provide the negative charge, such as negatively charged surface substituents. In a preferred embodiment, the negatively-charged latex polymer particles are obtained by utilizing a radical polymerization initiator or polymerization catalyst in the formation of the latex polymer particles which is capable of providing a negatively-charged moiety, such as sulfonate. For example, the radical polymerization of styrene in the presence of sodium dodecylbenzene-sulfonate and initiator ammonium persulfate provides negatively-charged surface moieties on the latex particles.

Other reactive components capable of providing a negative charge to the surface of the latex polymer particle may also be used, including any initiator or surfactant having a negatively-charged component, such as carboxylates or phosphonates, or a co-monomer with a labile proton such as acrylic acid or derivatives thereof.

The negatively-charged latex polymer particles should have a zeta potential of at least −5 mV, preferably in the range of from −10 mV to −75 mV, more preferably from −25 mV to −60 mV and still more preferably from −30 mV to −50 mV. Zeta potentials for these particles can be measured, for example, using a Malvern Zetasizer Nano ZS device.

Preferably the negatively-charged latex particle cores are polystyrene particles.

According to this embodiment, the composite particle has an outer portion or shell comprising an inorganic particulate which is preferably capable of providing beneficial keeping properties. This inorganic particulate should be positively-charged to enhance binding to the negatively-charged particle core.

Suitable positively-charged inorganic particulates may be, for example an alumina, a boehmite or a gibbsite, preferably providing beneficial properties, especially keeping properties, and include for example, aluminosilicate polymer particles, such as those described in WO-A-2004/039724, hybrid aluminosilicate polymer particles, such as those described in WO-A-2004/009494, and metal organosilicate polymer particulates, such as those described in WO-A-2008/075041, the disclosures of each of which are incorporated herein by reference. Other property-enhancing inorganic particulate materials may also be incorporated into the outer portion or shell of the composite particles, such as boron hydroxide species, such as those having the formula [B(OH)$_3$]$_n$, including their anhydrides.

Preferred aluminosilicate polymer particles are those having the formula:

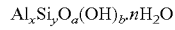

$Al_xSi_yO_a(OH)_b \cdot nH_2O$ wherein the ratio of x:y is in the range of from 0.5 to 4, a and b are selected such that the rule of charge neutrality is obeyed and n is in the range of from 0 to 10. More preferably, the ratio of x:y is from 1 to 3.

More preferably, aluminosilicate polymer particles may be obtained by the controlled hydrolysis of an aqueous alkali solution of a mixture of an aluminium compound such as halide, perchlorate, nitrate, sulfate salts or alkoxide species (Al(OR)$_3$) and a silicon compound, such as alkoxide species, wherein the molar ratio Al/Si is maintained between 1 and 3.6 and the alkali/Al molar ratio is maintained between 2.3 and 3, wherein R is an alkyl group having 1 to 5 carbon atoms. Such materials are described in WO-A-2004/039724, the disclosure of which is incorporated by reference.

Alternatively, aluminosilicate polymer particles may be obtained by the controlled hydrolysis of an aqueous alkali solution of a mixture of an aluminium compound such as halide, perchlorate, nitrate, sulfate salts or alkoxide species (Al(OR)$_3$) and a silicon compound, which is a mixture of a tetraalkoxide Si(OR)$_4$ and organotrialkoxide R'Si(OR)$_3$, wherein each R is independently an alkyl group having 1 to 5 carbon atoms and R' is H or a substituted or unsubstituted alkyl, alkenyl, aryl or benzyl group or a vinyl group, especially an alkyl or alkenyl group having 1 to 8 carbon atoms, and wherein the molar ratio Al/Si is maintained between 1 and 3.6 and the alkali/Al molar ratio is maintained between 2.3 and 3. Such materials are described in WO-A-2004/009494, the disclosure of which is incorporated by reference.

Another preferred inorganic particulate according to this embodiment are metal organosilicate polymer particulate materials, obtainable by contacting a metal salt (selected from one or more of aluminium, magnesium, strontium, calcium or zinc) with a silicon-containing compound having hydrolyzable and non-hydrolyzable substituents, in the presence of a base (which may be provided by the silicon-containing compound including a basic group) or in an organic solvent, especially wherein the metal to silicon ratio is in the range from 3:2 to 1:2. Such materials are described in WO-A-2008/075041, the disclosure of which is incorporated by reference.

Suitable such metal organosilicate polymer particulates are those having a metal, silicon, organic substituent arrangement according to the formula $M_mM'_n(SiR')_p(SiR'')_q$, wherein M and M' are the same or different and selected from one or more of magnesium, zinc, calcium, strontium and aluminium, preferably, magnesium, zinc and strontium, with most preferably at least one of M and M' being magnesium; R' and R'' may be the same or different and are organic substituents as defined for R' above and the ratio of (m+n)/(p+q) is in the range 1.5 to 0.5.

The inorganic particulate materials may have a particle size in the range of from about 0.5 nm to 30 nm, preferably from 1 nm to 10 nm and more preferably from 2.5 nm to 7.5 nm.

The particulate materials according to this embodiment may be prepared by first forming the negatively-charged core and then forming a shell of inorganic polymer particulate around it. For example, negatively-charged latex particles may be prepared by heating a dispersion of a monomer, such as styrene, with a radical polymerization initiator carrying a negatively-charged moiety, such as ammonium persulfate, and optionally a surfactant (preferably also having a negative charge), such as sodium dodecylbenzene sulfonate salt.

The shell is generated by generating a mixture of the negatively-charged organic polymer particulate and the inorganic polymer particulate (such as an aluminosilicate) in water and the dispersion mixed over a period of time in the presence of glass beads. Alternatively the shell material may be generated in situ during the shell-forming step.

According to a second embodiment, the core comprises a positively-charged latex polymer. The positively-charged latex polymer core is a latex polymer particle or agglomeration of such particles and preferably has modifications on the surface thereof to provide the positive charge, such as positively-charged surface substituents. In a preferred embodiment, the positively-charged latex polymer particles are obtained by utilizing a radical polymerization initiator or polymerization catalyst in the formation of the latex polymer particles, which is capable of providing a positively-charged moiety. For example, the radical polymerization of styrene in the presence of cetyltrimethylammonium bromide and initiator 2,2'-azobis(2-methyl-propionamidine) dihydrochloride provides positively-charged surface moieties on the latex particles.

Other reactive components capable of providing a positive charge to the surface of the modified latex polymer particle may also be used. For example, any initiator or surfactant having a positively-charged component, or a co-monomer with positive charge at certain pH, may be used.

The positively-charged latex polymer particles should have a zeta potential of at least +5 mV, preferably in the range of from +10 mV to +75 mV, more preferably from +25 mV to +60 mV and still more preferably from +30 mV to +50 mV. Zeta potentials for these particles can be measured, for example, using a Malvern Zetasizer Nano ZS device.

Preferably the positively-charged latex particle cores are polystyrene particles.

According to this embodiment, the composite particle has an outer portion or shell comprising an inorganic particulate, which is preferably capable of providing beneficial keeping properties or other active properties beneficial for use in an inkjet receiver. This inorganic particulate may be negatively-charged to enhance binding to the positively-charged particle core. Preferably, the negatively-charged inorganic particulate is a polymeric metal oxide.

Suitable negatively-charged inorganic particulates include, for example, silica, alumina, zinc oxide, zirconium oxide, titanium oxide, barium sulfate and clay minerals such as montmorillonite. Other suitable inorganic particulates include amorphous aluminol surface particles and acid-catalyzed silica particles as described in WO-A-2006/013024, the disclosure of which is incorporated herein by reference. Preferably, the inorganic particulates are amorphous silica, amorphous alumina and other metal oxides, acid-catalysed silica and mixtures thereof, in order to provide enhanced keeping properties and dye-stabilizing properties to the composite material for use in an inkjet receiver. Where the particulate is acid-catalysed silica or other acid-catalysed metal oxide polymeric particles, they may be pre-formed or formed in situ. By this it is meant that the acid-catalysed silica or other particles may be prepared prior to forming the shell on the positively-charged latex particle, or may be generated during the shell-forming step.

Where the negatively-charged inorganic particles are amorphous acid-catalysed silica particles, it is preferable that it has a degree of condensation of from 75% to 88%, preferably from 80% to 86%.

The inorganic particulate materials may have a particle size in the range of from about 0.5 nm to 30 nm, preferably from 1 nm to 10 nm and more preferably from 2.5 nm to 7.5 nm.

The particulate materials according to this embodiment may be prepared by first forming the positively-charged core and then forming a shell of inorganic polymer particulate around it. For example, positively-charged latex particles may be prepared by heating a dispersion of a monomer, such as styrene, with a radical polymerization initiator with a positively-charged component or reaction product, such as 2,2'-azobis(2-methylpropionamidine) dihydrochloride, and optionally a surfactant (preferably having a positive charge), such as cetyl-trimethylammonium bromide.

The shell is generated by dispersing a mixture of the positively-charged organic polymer particulate and the inorganic polymer particulate (such as silica) in water and the dispersion mixed over a period of time in the presence of glass beads. Alternatively the shell material may be generated in situ during the shell-forming step.

According to a third embodiment, the composite particles comprise core-shell particles where the inner portion or core comprises an organic polymer material comprising a functionalized latex particles and the outer portion is the shell comprises an oligomeric or polymeric metal oxide, the oligomeric or polymeric metal oxide being covalently bound to the latex material via a linker group.

The linker group may be any group capable of linking such an organic polymer with a polymeric metal oxide. Preferably, the linker group derives from such an organic polymer.

Preferably, the linker group comprises a terminal -M-O— group, wherein M represents a metal, which may be the same as or different from the metal of the oligomeric or polymeric metal oxide, which is linked to the oligomeric or polymeric metal oxide. More preferably, the linker group is a —Si—O— group.

The linker group is typically obtainable by reacting a metal oxide-reactive functionalized group on a functionalized organic polymer material, such as a functionalized latex, with an activated metal oxide. The metal oxide-reactive functionalized group preferably comprises a metal hydroxide terminal moiety, such as silicon hydroxide.

A suitable such metal oxide-reactive functionalized group may be formed as a terminal monomer on the functionalized organic polymer material or functionalized latex which forms the core of the particles according to this embodiment. Such a terminal monomer may be, for example, 3-(trimethoxysilyl)-propyl methacrylate, thereby forming a hydrolysable silane moiety on the surface of the polymer particle, which hydrolyses to a silicon hydroxide moiety, which is reactive with an activated metal oxide monomer, such as tetraethoxysilane (TEOS), the preferred metal oxide monomer according to this embodiment.

The particles according to this embodiment may be prepared by forming the functionalized organic polymer particles or functionalized latex particles having metal oxide-reactive functional groups thereon and growing metal oxide polymers on the surface thereof, thereby forming a shell of polymeric metal oxide having the desirable properties, covalently bound to an organic polymer or latex particle via a linker group. The functionalized organic polymer or functionalized latex may be prepared, for example, by the method described in Macromolecules, 2001, 34, 17, 5737-5739, the disclosure of which is incorporated herein by reference, to generate, for example, a silanol-functionalized latex.

To grow the polymeric metal oxide on the surface of the functionalized organic polymer particles, the functionalized organic polymer particles may be dispersed in a hydrochloric acid solution and treated with a solution of metal oxide monomer (e.g. tetraethoxysilane in ethanol). Freeze-drying of the resultant mixture provides the composite particles as a white powder. The metal oxide monomer may be any monomer which forms a metal oxide polymer upon activation with, for example, a metal oxide polymerization catalyst or activator.

In order to ensure that the metal oxide polymer is formed on the surface of the functionalized organic polymer, the metal oxide polymerization is generally conducted in dilute conditions. Preferably, the metal oxide is added slowly, preferably dropwise, to the reaction mixture to ensure the concentration of metal oxide monomer is maintained at a dilute level, e.g. below 3 mmol metal oxide monomer/g functionalized latex. The reaction typically employs an amount of metal oxide (e.g. TEOS) of up to 30 mmol/g of functionalized latex, preferably in the range of from 3 mmol to 30 mmol/g, and more preferably from 5 mmol to 10 mmol/g.

The core-shell particles according to this third embodiment, therefore, are obtainable by reacting a functionalized organic polymer comprising functionalized latex particles with a metal oxide monomer in the presence of a metal oxide polymerization catalyst.

The preferred metal oxide monomers are metal alkoxides, such as tetraethoxysilane. The preferred polymerization catalyst is hydrochloric acid.

The particulate materials described above are utilized in an ink-receiving layer, preferably an image-receiving layer of an inkjet receiver. The inkjet receiver comprises a support and at least one ink-receiving layer comprising composite particles of the type described above and a binder.

The support may be any suitable support and may be selected according to the desired use and may be, for example, a transparent or opaque thermoplastic film, especially a polyester base film such as polyethylene terephthalate or polymethylmethacrylate; cellulose derivatives, such as cellulose ester, cellulose triacetate, cellulose diacetate; polyacrylates; polyimides; polyamides; polycarbonates; polystyrenes; polyolefines; polysulfones; polyetherimides; vinyl polymers such as polyvinyl chloride; and their mixtures. Alternatively, the support may be paper, one or preferably both sides of which may be coated with a polyethylene layer. When the support comprising the paper pulp is coated on both sides with polyethylene, it is commonly referred to as resin coated paper (RC Paper). The side of the support that is used can be coated with a base layer, for example a very thin layer of gelatin or another composition, to ensure the adhesion of the first layer on the support.

The support used may be of any suitable thickness, such as, for example from 50 to 500 µm, or preferably from 75 to 300 µm. Antioxidants, antistatic agents, plasticizers or other known additives may be incorporated into the support, if desired.

The inkjet receiver has one or more layers coated on to the support, at least one layer of which comprises at least one composite particulate material as described above, the inclusion of which material is capable of eliciting the keeping benefits described herein. Each such layer comprises the composite particulate material and a binder and optional further components such as another composite particulate material, metal oxide or particulate, filler or other components as desired.

The inkjet receiver according to the invention may comprise one layer coated onto the support, the layer comprising the composite particulate material and a binder, or multiple layers, one or more of which comprise the composite particulate material. Where more than one layer is coated onto the support, the inkjet receiver (or inkjet recording element) may be described as having an ink-receiving pack, which comprises the ink-receiving layers including image-receiving layers, being an ink-receiving layer in which the dye (or pigment) image is actually formed. The inkjet receiver may comprise one or more base layers between the ink-receiving pack and the support and a top layer for protecting the ink-receiving pack.

The ink-receiving pack comprises, for example, one or more image-receiving layers (typically one image-receiving layer) and further layers which are involved in the ink-receiving process, such as those intended to absorb the carrier fluid of the ink or provide capacity (e.g. a sump) or to increase the draw or rate of uptake of ink from the surface of the receiver. Typically, the ink-receiving pack comprises the image-receiving layer(s) and the liquid-absorbing layers and any intermediate layers.

The binder used in the at least one composite particulate material containing layer of the inkjet receiver may be any suitable material for binding composite particulate material in an inkjet receiver layer. Suitable such binders may be selected, for example, from one or more of naturally occurring hydrophilic colloids and gums such as gelatin, albumin, guar, xantham, acacia and chitosan and their derivatives, functionalized proteins, functionalized gums and starches, cellulose ethers and their derivatives, such as hydroxyethyl cellulose, hydroxy-propyl cellulose and carboxymethyl cellulose, latex polymers such as styrene butadiene latex and styrene acrylate latex, polyvinyl oxazoline and polyvinyl methyloxazoline, polyoxides, polyethers, poly(ethylene imine), poly(acrylic acid), poly(methacrylic acid), n-vinyl amides including polyacrylamide and polyvinyl pyrrolidone, polyethylene oxide and polyvinyl alcohol, its derivatives and copolymers. Preferably, the binder is at least one hydrosoluble binder, which is preferably a gelatin or polyvinyl alcohol. The binder may be a gelatin, such as that conventionally used in the photographic field. Such a gelatin is described in Research Disclosure, September 1994, No. 36544, part IIA. *Research Disclosure* is a publication of Kenneth Mason Publications Ltd., Dudley House, 12 North Street, Emsworth, Hampshire PO107DQ, United Kingdom. The gelatin can be obtained from SKW, France, and the polyvinyl alcohol from Nippon Gohsei or Alfa Aesar. Preferably, the binder is a polyvinyl alcohol.

Any other layers of the inkjet receiver may also comprise a binder as defined above.

Optionally, an ink-receiving layer may comprise the composite particles of the invention and another inorganic particulate material, such as a different composite particle according to this invention or another inorganic particulate used in inkjet media. Further inorganic particulate materials may be any suitable inorganic particulate capable of forming a porous receiving layer with a composite particulate material of the invention and a suitable binder. Suitable such inorganic particulate materials may include, for example silica (e.g. colloidal silica), alumina (e.g. alumina sols, colloidal alumina, cationic aluminium oxide or hydrates thereof, pseudo-boehmite, etc.), surface-treated cationic colloidal silica, magnesium silicate, aluminium silicate, calcium carbonate, magnesium carbonate, kaolin, talc, calcium sulfate, barium sulfate, titanium dioxide, zinc oxide, zinc sulfide, zinc carbonate, satin white, diatomaceous earth, calcium silicate, aluminium hydroxide, lithopone, zeolite(s) (such as molecular sieves 3A, 4A, 5A and 13X) and magnesium hydroxide. Preferably, such a further inorganic particulate material is a colloidal silica or an alumina. Examples of suitable colloidal silicas include, for example, Nalco® 1115 (4 nm), Ludox® SM-30 (7 nm), Ludox® LS-30 (12 nm), Ludox® TM-40 (22 nm), Ludox® AM (~30 nm), Ludox® TM-30 (~50 nm) and Ludox® PW-50 (~80 nm), or a mixture thereof.

The alumina may be one or more forms of alumina, such as, for example, porous alumina, amorphous alumina, boehmite (such as a pseudo-boehmite modified with rare earths as described in U.S. Pat. No. 6,256,419, the disclosure of which is incorporated herein by reference), alumina hydrate particles, alumina hydrate surface-coated particles (e.g. alumina hydrate surface coated silica particles) or fumed alumina. Specific examples of fumed alumina include those available from Cabot Corporation under the trade name CAB-O-SPERSE™ PG003.

The composite particulate materials described above may be coated onto a support or inkjet receiver precursor material to form an ink-receiving layer. The composite particulate materials are typically coated in a coating composition comprising the composite particulate material, a binder and a carrier medium. The binder may be any binder as defined above, but is preferably a water-soluble binder such as polyvinyl alcohol. The carrier medium may be any suitable organic or aqueous carrier medium suitable for coating a layer onto an inkjet receiver and is preferably water.

The coating composition may further comprise other components useful for aiding coating or providing additional beneficial properties to the inkjet receiver. For example, the coating composition may comprise a surfactant to aid coating of the composition, and any other additive known to those skilled in the art to improve the properties of the resulting image such as, for example, UV ray absorbers, optical brightening agents, antioxidants or plasticizers.

Suitable surfactants added, for example, to improve the coatability of the coating composition depending upon the coating method used, include fluorosurfactants such as Lodyne® S100 or Zonyl® FSN, or a non-fluoro surfactants such as Olin® 10G.

The coating composition and the ink-receiving layer formed therefrom comprise a suitable amount of binder to enable the composite particles therein to be bound together in a layer, whilst retaining a high degree of porosity in the resulting ink-receiving layer.

The binder may be present in an amount of from 3 to 40% by dry weight of the total dry solids content of the composite particulate material containing layer, preferably from 5 to 30%, still more preferably from 7 to 15%.

The inkjet receiver or recording element according to the invention can comprise, besides the ink-receiving layer described above, other layers having another function, arranged above or below said ink-receiving layer. Preferably, at least one ink-receiving layer containing composite particulate material as described above is the image-receiving layer.

The inkjet receiver is formed by coating one or more layers of coating composition onto a support and then drying, either by simultaneous coating or sequential, multi-pass coating. The coating technique used may be any suitable technique, such as, for example, dip coating, wound-wire rod coating, doctor blade coating, rod coating, air knife coating, gravure and reverse-roll coating, slide coating, bead coating extrusion coating, curtain coating and the like. Preferably an extrusion coating or curtain coating technique is used.

In the coating process, any optional subbing layer is preferably first coated onto the support and dried and then the layers of ink-receiving pack coated simultaneously or sequentially onto the optionally coated support. Where there are two layers in the ink-receiving pack, the two layers may be coated sequentially with drying of the second layer prior to coating the first layer or may be coated simultaneously. A third or subsequent layer of the ink-receiving pack may be coated prior to the upper layers or simultaneously with the second or second and first layers.

To produce the coating composition intended to be coated onto the support to constitute the ink-receiving layer of the inkjet receiver (or recording element) described above, the binder, which is preferably a hydro-soluble binder such as polyvinyl alcohol, is diluted in the solvent (preferably water) to adjust its viscosity and facilitate its coating. The binder solution is mixed with a dispersion of the composite particulate to form a coating solution and any additional components included. The composition then has the form of an aqueous solution or a dispersion containing all the necessary components.

The composition is preferably applied with a thickness approximately between 20 and 300 μm in the wet state, more preferably between 100 and 300 μm and most preferably about 200 μm. The composition forming the ink-receiving layer can be applied to both sides of the support. It is also possible to provide an antistatic or anti-winding layer on the back of the support coated with the ink-receiving layer.

Optionally, the image-receiving layer, which is preferably the composite particulate material-containing layer, may comprise a mordant. The mordant may be any suitable mordant and may be any one or more of, for example, a cationic polymer, e.g. a polymeric quaternary ammonium compound, or a basic polymer, such as poly(dimethylaminoethyl)methacrylate, polyalkylenepolyamines, and products of the condensation thereof with dicyanodiamide, amineepichloro-hydrin polycondensates, divalent Group 11 metal ions, lecithin and phospholipid compounds or any suitable mordant that is capable of assisting with fixing a dye material transferred to it. Examples of such mordants include vinylbenzyl trimethyl ammonium chloride/ethylene glycol dimethacrylate, poly (diallyl dimethyl ammonium chloride), poly(2-N,N,N-trimethylammonium) ethyl methacrylate methosulfate, poly(3-N, N,N-trimethylammonium)propyl chloride. A preferred mordant is a quaternary ammonium compound, such as, for example, a polymer of (m- and p-chloromethyl)ethenylbenzene and 2-methyl-2-propenoic acid 1,2-ethanediylester, quaternized with N,N-dimethylmethanamine. Alternatively, the composite particulate material of the invention which is included in the image-receiving layer has a mordant capability due to the properties of the inorganic particulate shell or by inclusion of mordant component in the shell-forming mixture.

The layer may, optionally, further comprise an amorphous hydrated aluminosilicate, for the reduction of smearing of an image when a printed receiver is stored at high temperatures and humidifies. Suitable such materials are described in WO 2004/039724 and WO 2004/009494, the disclosures of which are incorporated herein by reference.

The ink-receiving layer preferably comprises from 5 to 95 wt % of composite particulate material, compared with the total weight of the dry state ink-receiving layer.

The composite particulate material for use in the invention may typically be present in an ink-receiving layer of the inkjet receiver in an amount of from 5 to 40 $g/m^2$, preferably 15 to 25 $g/m^2$, especially where the particulate material makes up the main component of the ink-receiving pack. Where other particulate materials are present, the composite particulate material typically comprises at least 5 wt % (e.g. from 5 to 95 wt %) of the particulate material and preferably in the range of from 5 to 15 wt % to ensure the beneficial properties are provided in an economic manner. When used in a multi-layer system, the active composite material may be used in a thin dye-receiving layer in which the dry lay down of the composite particulate material may be, for example, in the range 0.5 to 5 $g/m^2$, more preferably 1.5 to 3 $g/m^2$.

Optionally, the inkjet receiver comprises a subbing layer between the support and the ink-receiving pack. The subbing layer is preferably coated onto the support prior to coating the lowest layer of the ink-receiving pack, e.g. the subbing layer may be coated in a separate pass of a coating station to that of the ink-receiving pack. The subbing layer may be adjacent to the lowest layer of the ink-receiving pack or may be separated by one or more interlayers.

The subbing layer, which improves the adhesion of the under layer of the ink-receiving pack to the support, typically comprises a polymer material, such as sulfonated polyesters, gelatin, poly(vinyl pyrrolidone), cellulose ethers and their derivatives such as methyl cellulose, capable of improving the adhesion of the under layer of the ink-receiving pack to the support. Preferably the subbing layer comprises a boric acid, borate or derivative and/or salt thereof. Suitable boric acid, borates and derivatives and/or salts thereof include sodium borates, derivatives of boric acid, boric anhydride and the like. A particularly preferred borate is sodium tetraborate decahydrate, which is available from Borax Limited under the trade name Borax® Decahydrate.

The total dry lay down of material in the subbing layer is preferably in the range 0.5 to 3 $g/m^2$, more preferably 1.5 to 2.5 $g/m^2$.

Optional additional components for inclusion in the subbing layer include surfactants, for facilitating coating of the subbing layer onto the support.

An inkjet receiver of the present invention may be manufactured by coating the ink-receiving pack and any optional further layers, such as the subbing layer onto the support by any suitable process known in the art. In order to improve the adhesion of the ink-receiving pack and optional further layers to the support, the surface of the support may optionally be subjected to a corona discharge treatment prior to applying the coatings.

The ink-receiving layer useful in the present invention has a thickness generally between 1 μm and 50 μm in the dry state. The inkjet recording element comprising such an ink-receiving layer has improved dye-keeping properties in time as well as an improved instant dryness. It can be used for any type of inkjet printer as well as for all the inks developed for this technology.

Another aspect of the invention relates to an inkjet printing method comprising the steps of: (a) providing an inkjet printer that is responsive to digital data signals; (b) loading the inkjet printer with the inkjet recording element described above; (c) loading the inkjet printer with an inkjet ink; and (d) printing on the inkjet recording element using the inkjet ink in response to the digital data signals.

It is envisaged that the composite particle formulations, general and specific, described herein could be utilized to elicit beneficial properties to an inkjet receiver in addition to or instead of improved keeping, such as enhanced gloss, tinting or whitening, increased image sharpness or improved dry time. Optionally, the outer portion or shell may additionally or alternatively comprise inorganic material that has other additional or alternative properties such as those described above or the ability to be so functionalized.

The following examples further illustrate the invention.

EXAMPLES

Example 1

(a) Synthesis of positively-charged latex aqueous dispersion, latex P.

A reactor was charged with cetyltrimethylammonium bromide (7.5 g), 2,2'azobis(2-methylpropionamidine) dihydrochloride (7.5 g), styrene (500 g), and deionized water (4500 g) and the contents heated to 70° C. The mixture was maintained at 70° C. for 30 min. After this first step of polymerization, the polymerization process was continued by adding reactants into the reactor via a discontinuous mode during 45 min. The composition of the added mixture was cetyltrimethylammonium bromide (15 g), 2,2'azobis(2-methylpropionamidine) dihydrochloride (4 g), styrene (700 g) and deionized water (500 g). At the end of the addition, the reactor was maintained at 70° C. for 2 h to complete the polymerization reaction of styrene monomer. The synthesized latex was characterized as follows: solid content 20.0%, polymer content 19.6%, conversion rate 98.8%. The average particle diameter measured by photon correlation spectroscopy (Malvern Zetasizer Nano ZS) was 78 nm. The zeta potential (Malvern Zetasizer Nano ZS) was +36 mV.

(b) Synthesis of negatively-charged latex aqueous dispersion N.

A reactor was charged with deionized water (6000 g) and degassed under nitrogen flux and then heated to 70° C. Sodium dodecylbenzenesulfonate salt (4.8 g) was added into the water with stirring. After complete dissolution and under nitrogen atmosphere methacrylic acid (35 g) was added to the reaction mixture, followed by styrene (1611 g). The reaction mixture was maintained at 70° C. under nitrogen atmosphere with stirring. The polymerization catalyst ammonium persulfate 3.18 g) was added and the reaction was maintained for 3 h. The synthesized latex was characterized as follows: solid content 20.6%, conversion rate 100%. The average particle diameter measured by photon correlation spectroscopy was 112 nm. The zeta potential was −47 mV.

Latexes N and P, provided by E. Bourgeat-Lamy of Laboratoire de Chimie et des Procédés de Polimérisation (Lyon University, France), including a negatively-charged latex dispersion N (average particle size 112 nm, solids content 20.6%) and a positively-charged latex dispersion P (average particle size 78 nm, solids content 20.0%) were prepared according to the above procedures and used to prepare composite dispersions of the present invention.

(c) Preparation of aluminosilicate polymer particle dispersion AS-1:

A dispersion of aluminosilicate particles AS-1 was prepared according to the following procedure: 15.4 kg of $AlCl_3.6H_2O$ was solubilized in 47.5 g osmosed water and 690 g ethanol. 7.48 kg tetraethoxysilane was then added to the mixture. 14.9 l 10 M NaOH aqueous solution was added with stirring. The mixture was stirred at room temperature overnight. The dispersion was then diafiltrated using a Filmtec NF 2540 nanofiltration membrane (surface area 6 $m^2$) to eliminate the sodium salts to achieve an Al/Na ratio greater than 100. The retentate resulting from the diafiltration by nanofiltration was concentrated to obtain a gel with about 16.6% by weight of aluminosilicate polymer used in the present invention. The average particle size was 5 nm (observed on TEM micrographs, Philips).

Example 2

Composite Particles Comprising Negatively-Charged Latex N and Aluminosilicate Polymer Particulate Materials Composite particles according to the invention were produced by the following procedure. Mixtures were prepared comprising the dispersion of negatively-charged latex N in water and the dispersion of aluminosilicate AS-1 in water in different proportions varying from 10% to 30% weight of aluminosilicate polymer particles and comprising a total weight of 7 g with a 20.6% solid content. The combined dispersions were mixed for 4 h on a roller stirrer in the presence of 5 glass beads (10 mm). Comparative dispersions of the latex dispersion N (negatively-charged latex polymer without shell) and the aluminosilicate AS-1 (particle comprising solely of the shell material, aluminosilicate AS-1) were prepared in an analogous manner.

Figure 2:
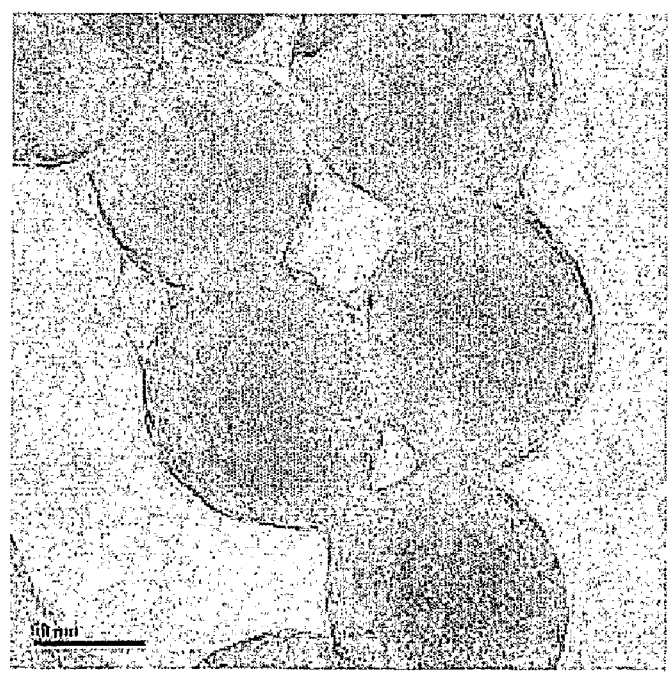
FIG. 2 is a transmission electron micrograph of particles of the inventive composite dispersion CD-1 at 300× magnification.
Figure 3:
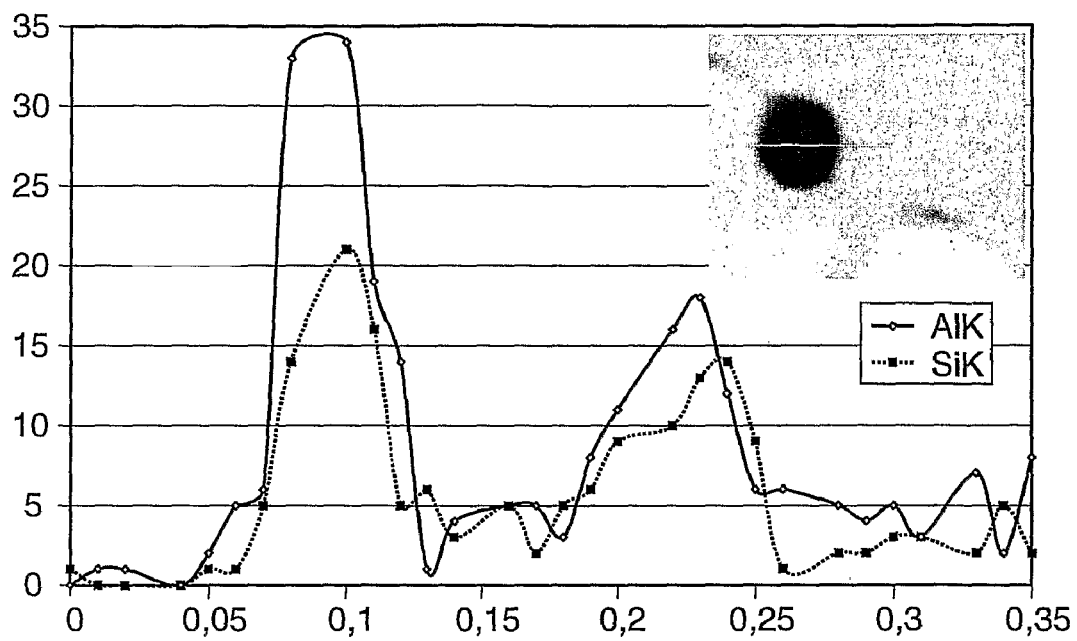
FIG. 3 is an Energy Dispersive Spectroscopy (EDS) analysis of the edge region of a particle of the inventive composite dispersion CD-1. The x-axis represents displacement of the probe spot across on particle and the y-axis represents intensity. The line including diamonds represents the signal from the Al Kα line and the line including squares represents the signal from the Si Kα line.

TEM micrographs shown on FIGS. 1 and 2 indicated that core-shell particles were formed. The Energy Dispersive Spectroscopy (EDS) profiles of Al and Si on a spherical composite particle showed that the aluminosilicate polymer was formed around the core latex particle (FIG. 3). In addition, the zeta potential values measured on a Zetasizer Nano ZS (Malvern) showed that the negative surface potential of the original latex particles was converted to a positive surface potential when the aluminosilicate polymer was added to form the composite particles.

TABLE 1

Dispersions of composite materials

| Dispersion | Weight of latex N (%) | Weight of aluminosilicate polymer AS-1 (%) | Zeta potential (mV) |
|---|---|---|---|
| CD-1 | 90 | 10 | +46 |
| CD-2 | 80 | 20 | +52 |
| CD-3 | 70 | 30 | +53 |
| Latex dispersion N (comp) | 100 | 0 | −47 |
| Aluminosilicate AS-1 (comp) | 0 | 100 | +55 |

Preparation of Inkjet Recording Material

To 7 g of each of the suspensions listed in TABLE 1 was added 2 g polyvinyl alcohol at 9% in water, followed by 0.01 g of OLIN™ 10G surfactant. Water was added to achieve a total weight of 11 g. The resulting mixtures was coated onto a resin-coated base paper (Edge Paper, Kodak™) with a wet thickness of 200 μm and dried at room temperature.

Coating Evaluation

Each of the resulting coatings was printed using a Hewlett Packard™ 5550 inkjet printer. Each ink (black, cyan, magenta, and yellow) was printed in 6 steps of increasing density, and the optical density of each step was measured. The samples were then placed together in a controlled atmosphere of 1 part per million ozone concentration and the densities at each step re-measured after 24 h. The maximum % density loss upon ozone exposure is summarized for each ink in TABLE 2.

TABLE 2

% Fade of inkjet prints exposed to ozone

| Sample | Fraction of active material | Particle dispersion | Density Loss (%) | | | |
|---|---|---|---|---|---|---|
| | | | Black | Cyan | Magenta | Yellow |
| Comparison 1 | 0% | Latex N | 54.7 | 36 | 65.4 | 5.9 |
| Inv 1 | 10% | CD-1 | 46.5 | 18.4 | 60.2 | 6.1 |
| Inv 2 | 20% | CD-2 | 18.3 | 12.4 | 30.4 | 5.8 |
| Inv 3 | 30% | CD-3 | 5.1 | 9.1 | 5.8 | 1.6 |
| Comparison 2 | 100% | AS-1 | 14.8 | 9.8 | 12.1 | 8.3 |

The column fraction of active material represents the weight fraction of inorganic aluminosilicate polymer in the dispersion.

The coating thicknesses were measured by SEM on coating cross-sections and reported in TABLE 3.

TABLE 3

Summary of coating thickness and fade resistance

| Sample | Particle dispersion | Particle mean density | Dry layer thickness (μm) | Fade resistance |
|---|---|---|---|---|
| Comparison 1 | Latex N | 1.05 | 30 | Bad |
| Invention 1 | CD-1 | 1.21 | 31 | Medium |
| Invention 2 | CD-2 | 1.38 | 27 | Good |
| Invention 3 | CD-3 | 1.58 | 27 | Very Good |
| Comparison 2 | AS-1 | 2.75 | 16 | Very good |

The coating compositions containing the composite particles of latex and aluminosilicate for use in the invention provided a greater coating thickness and thus, considering a 40% porosity associated to the close-packed spherical particles, a larger ink capacity, for a given coated weight than coating compositions comprising comparison aluminosilicate polymer particles. Also resistance to ozone-induced fade was improved in the coating comprising composite particles compared to those comprising purely negatively-charged latex particles. Also surprisingly, the composite dispersions CD-2 and especially CD-3 provided equivalent or superior resistance to ozone fade compared to an equal weight of the pure aluminosilicate dispersion AS-1, even though the fraction of aluminosilicate polymer in the composite dispersions was much less than 100%. Although Comparison 2 had improved density loss compared with CD-1 and for some colours CD-2, this would be balanced by both CD-1 and CD-2 providing a better ink-receiving capacity as a result of the larger porosity.

Example 3

Composite Particles Comprising Negatively-Charged Latex N and Metal Organosilicate Polymer Particulate Materials Composite particles were prepared according to the same procedure as Example 2, except that metal organosilicate polymer particulate material 1 (OS-1) was substituted for the dispersion of aluminosilicate polymer particles, to produce composite dispersions CD-4 through CD 6 respectively. OS-1 was prepared following the synthetic pathway described in Journal of Materials Chemistry, 1998. 8(8), 1927-1932.

OS-1 was prepared as follows: 1.2 mol $MgCl_2.6H_2O$ was solubilized in 2900 g ethanol and then 312 g (3-aminopropyl) triethoxysilane quickly added. A white precipitate was formed and the mixture stirred at room temperature for 24 h. After filtration, the white precipitate was washed with 2000 g ethanol. The white powder was dried at room temperature for 2 days. The yield versus Mg was 93%. The molar ratio Mg/Si was 0.6, as measured by ICP-AES (Inductively Coupled Plasma Atomic Emission Spectrophotometry).

Coating compositions were prepared and evaluated by the same procedures as described in Example 2.

A comparative coating was prepared with OS-1 (Comparative 3) using the same formula composition as for the composite materials formulation.

The results are shown in TABLE 4

TABLE 4

Evaluation of coatings comprising composite particles of negatively-
charged latexes and metal organosilicate polymer particulate material

| Sample | Latex N weight % | OS-1 weight % | Wt % of active materials | Particle dispersion | Density Loss (%) | | | |
|---|---|---|---|---|---|---|---|---|
| | | | | | Black | Cyan | Magenta | Yellow |
| Comp 1 | 100% | 0% | 0% | Latex N | 56.4 | 40.2 | 69.4 | 7.4 |
| Inv 4 | 90% | 10% | 10% | CD-4 | 38.1 | 9.9 | 68.6 | 24.6 |
| Inv 5 | 80% | 20% | 20% | CD-5 | 19.1 | 5.5 | 37.2 | 25.4 |
| Inv 6 | 70% | 30% | 30% | CD-6 | 2.1 | 2.2 | 5 | 3.1 |
| Comp 3 | 0% | 100% | 100% | OS-1 | 21.6 | 19.2 | 29.6 | 18.6 |

The composite particles for use in the invention provided improved resistance to density loss from ozone exposure in an inkjet receiver compared to the receivers comprising pure latex particles. Surprisingly, superior resistance to ozone degradation was obtained for a much smaller amount of active materials in coatings made with composite dispersions CD-5 or CD-6 for use in the invention, compared to a coating made with only active materials (Comparative 3). Although ozone fade was only superior in CD-4 compared to that of Comparison 3 with regard to cyan, this would be balanced providing a better ink-receiving capacity as a result of the larger porosity.

Example 4

Composite Particles Comprising Positively-Charged Latexes and Silica or Acid Catalyzed Silica Silica particles were provided by Nalco under the reference Nalco 2329. Acid catalyzed silica was synthesized following the synthetic pathway described for Polymer 6 in WO-A-2006/013024. Composite particles were prepared according to the same procedure as Example 2, except that silica dispersions were substituted for the dispersion of aluminosilicate polymer, to produce composite dispersions CD-7 and CD-8, according to the summary in TABLE 5. Mixtures were prepared comprising the dispersion Latex P in water with a dispersion of acid-catalyzed silica at 16.66% in water or with a dispersion of Nalco 2329 silica (Nalco) in different proportions varying from 10% to 100% weight of silica and comprising a total weight of 14.6 g. The combined dispersions were mixed for 4 h on a roller stirrer in presence of 5 glass beads (10 mm).

Coating compositions were prepared according to the following procedure. To 14.6 g of each of the above dispersions was added 4 g of polyvinyl alcohol at 9% in water and 0.02 g of OLIN™ 10G surfactant. Water was added to achieve a total weight of 22 g. The resulting mixture was coated onto a resin-coated base paper (Edge Paper, Kodak™) with a 200 μm wet thickness and dried at room temperature. Comparative coatings were prepared with Latex P (without shell) (Comparative 4) using the same formula composition as for the composite materials formulation.

Coating Evaluation

Evaluation of the coatings was carried out in the same way as in Example 1. The results are summarized in TABLE 6 below.

TABLE 6

| | Particle dispersion (weight %) | | | Density Loss (%) | | | | Fraction active material |
|---|---|---|---|---|---|---|---|---|
| Sample | Latex P | Acid catalyzed Silica | Nalco 2923 Silica | Black | Cyan | Magenta | Yellow | |
| Comp 4 | 100% | 0% | 0% | 74.2 | 60.4 | 86.2 | 25.3 | 0% |
| CD-7 | 70% | 30% | 0% | 61.7 | 51.7 | 81.8 | 18.7 | 30% |
| Comp 5 | 0% | 100% | 0% | 4.6 | 2.7 | 5.4 | 0.3 | 100% |
| CD-8 | 70% | 0% | 30% | 49.1 | 43.7 | 67 | 11.9 | 30% |

The composite particles for use in the invention provided improved resistance to density loss from ozone exposure in an inkjet receiver compared to the receivers comprising pure latex particles (Comparison 4). Although the density loss was not improved in the composite particles of the invention compared to Comparison 5, the gloss was improved since CD-7 and CD-8 are made of discrete particles whereas Comparison 5 comprises a silica continuum.

Example 5

Figure 4:
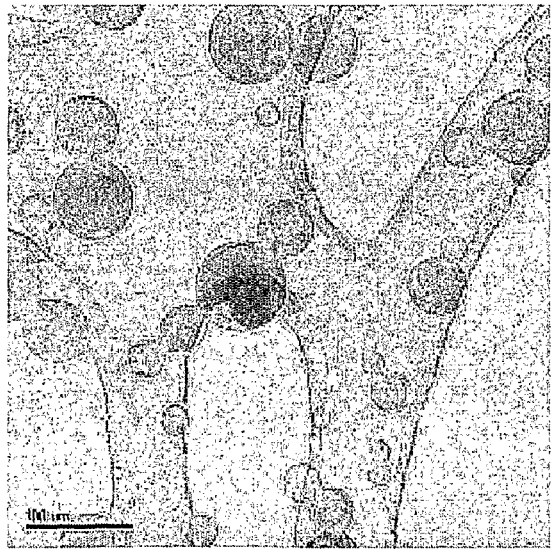
FIG. 4 is a transmission electron micrograph of particles of the comparative latex dispersion P at 175× magnification.
Figure 5:
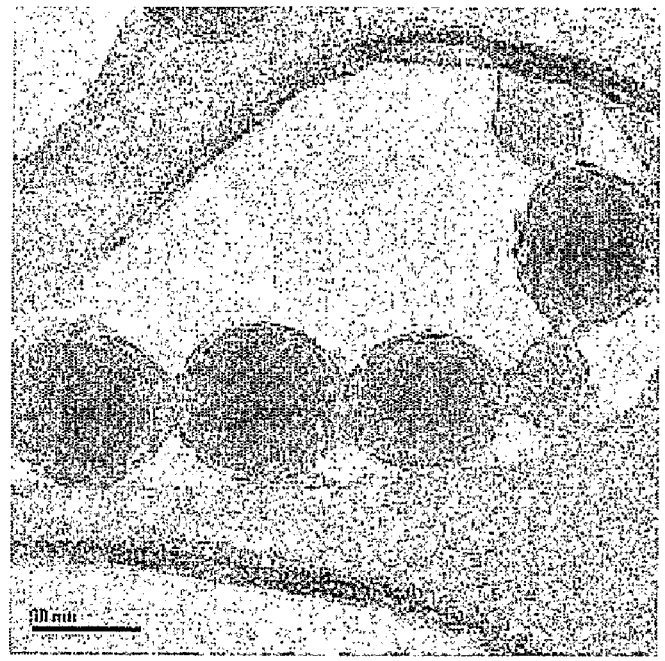
FIG. 5 is a transmission electron micrograph of particles of the inventive composite dispersion CD-9 at 300× magnification.

Synthesis of Acid-Catalyzed Silica in the Presence of Positively-Charged Latex to Form a Dispersion of Composite Particles A thermo-regulated reactor was charged with 51 g Latex P, 49 g deionized water and 1 ml hydrochloric acid (0.1 mol/l) and then heated to 60° C. Then a mixture of tetraethoxysilane (TEOS, 33.2 g) and ethanol (4.2 g) was added dropwise over a period of 90 min. At the end of the TEOS addition, a suspension was obtained which turned into gel after an additional 2.5 h heating at 60° C. The resulting suspension was then freeze-dried and a white powder CD-9 was obtained. Composite material was obtained as shown on the TEM micrograph shown on FIGS. 4 and 5.

Preparation of Inkjet Recording Material 1.5 g of the solid described above in 7.5 g water was mixed with 2 g polyvinyl alcohol at 9% in water overnight on a roller stirrer in the presence of 5 glass beads (10 mm). The resulting mixture was coated onto a resin-coated base paper (Edge Paper, Kodak™) with a 200 μm-wet thickness and dried at room temperature.

Coating Evaluation

Each of the resulting coatings was evaluated for resistance to ozone-induced fade according to the procedure described in Example 1. The results are summarized in TABLE 5 below.

TABLE 5

% Fade of inkjet prints exposed to ozone

| Sample | Particle dispersion | Density Loss (%) | | | |
|---|---|---|---|---|---|
| | | Black | Cyan | Magenta | Yellow |
| Comparison 4 | Latex P | 74.5 | 57.7 | 70.1 | 56.6 |
| Invention | CD-9 | 6.9 | 6.9 | 10.7 | 4.1 |

The composite particles for use in the invention provided improved resistance to density loss from ozone exposure in an inkjet receiver compared to a receiver comprising pure positively-charged latex particles.

Example 6

Synthesis of Acid-Catalyzed Silica in the Presence of Functionalized Latex to Form a Dispersion of Composite Particles
(a) Preparation of Silanol-Functionalized Latex (According to Macromolecules, 2001, 34, 17, 5737-5739).

A temperature-controlled reactor with good stirring was charged with deionized and degassed water (400 g), dihydrogenphosphate (0.4 g), dihydrogenocarbonate (0.4 g), Rafulon surfactant (0.8 g), potassium persulfate (0.4 g) and styrene (40 g). The mixture was heated to 70° C. and maintained for 90 min. under inert atmosphere nitrogen. After 90 min. heating, 3-(trimethoxy-silyl)propylmethacrylate (4.25 g) was added and then the reaction was maintained at 70° C. for a further 3.5 h. The resulting suspension was washed three times for 24 h in 15 l of deionized water using a dialysis bag. The functionalized latex F was then obtained as a suspension at 9.8% solid.

(b) Preparation of Composite Particles

Figure 6:
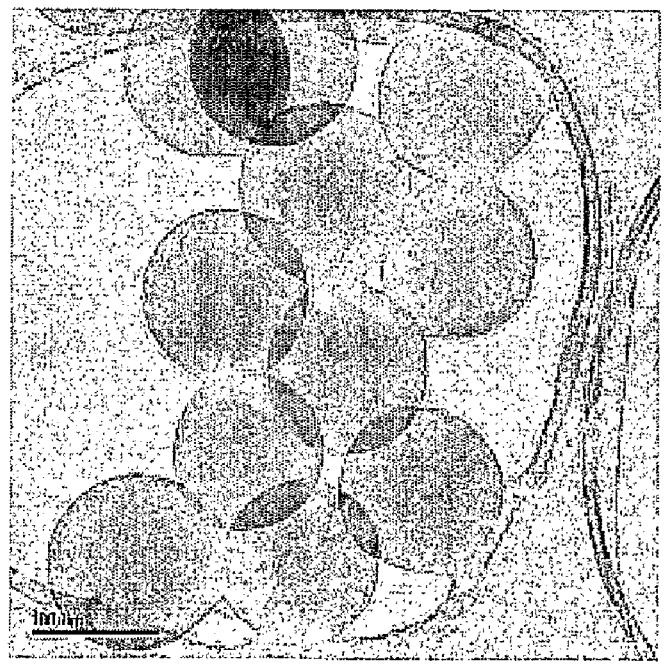
FIG. 6 is a transmission electron micrograph of particles of the comparative latex dispersion F at 175× magnification.
Figure 7:
FIG. 7 is a transmission electron micrograph of particles of the inventive composite dispersion CD-10 at 300× magnification.

A temperature-controlled reactor with stirring was charged with functionalized latex F (9.8% solid solution, 100 g) and hydrochloric acid (0.1 mol/l, 2 ml). The reactor was heated at 60° C. and then a mixture of 33.2 g tetraethoxysilane (TEOS, 33.2 g) and ethanol (4.2 g) was added dropwise over a period of 90 min. The temperature was maintained for 3 h. Then the gel phase on the wall was freeze-dried and a white powder CD-10 was obtained. A composite material was obtained as shown on the TEM micrograph shown on FIGS. 6 and 7.

The composite dispersion for use in the present invention and comparative dispersion of Latex F alone (Comparative 5) were evaluated by forming coating compositions, inkjet recording media, and inkjet prints as described in Example 5. The results of testing for resistance to ozone-induced fading are shown in TABLE 6.

TABLE 6

% Fade of inkjet prints exposed to ozone

| Sample | Particle dispersion | Density Loss (%) | | | |
|---|---|---|---|---|---|
| | | Black | Cyan | Magenta | Yellow |
| Comparison 5 | Latex F | 72.4 | 44.6 | 88.2 | 27.3 |
| Invention | CD-10 | 20.8 | 18.7 | 22.4 | 7.6 |

The composite particles for use in the invention provided improved resistance to density loss from ozone exposure in an inkjet receiver compared to a receiver comprising pure surface modified latex particles.

The invention has been described with reference to a preferred embodiment. However, it will be appreciated that variations and modifications can be effected by a person of ordinary skill in the art without departing from the scope of the invention.

The patents and publications referred to herein are incorporated by reference in their entirety.

The invention claimed is:

1. An inkjet receiver comprising a support and one or more layers coated on the support, at least one of which comprises a particulate material and a binder, the particulate material comprising composite particles having an inner portion and an outer portion, wherein the inner portion comprises an organic polymer material comprising latex particles selected from a functionalized latex, and the outer portion comprises an inorganic material having enhanced keeping properties, wherein the composite particles are core-shell particles where the inner portion is the core and the outer portion is the shell, the core-shell particles comprising
   a core comprising an organic polymer which is a functionalized latex; and
   a shell comprising an oligomeric or polymeric metal oxide, the oligomeric or polymeric metal oxide being covalently bound to the latex via a linker group.

2. An inkjet receiver as claimed in claim 1, wherein the linker group comprises a terminal -M-O— group, wherein the M represents a metal, which may be the same as or different from the metal of the oligomeric or polymeric metal oxide and the O group is an oxygen, which is linked to the oligomeric or polymeric metal oxide.

3. An inkjet receiver as claimed in claim 2, wherein the terminal -M-O— group is a —Si—O— group.

4. An inkjet receiver as claimed in claim 1, wherein the linker group is obtainable by reacting a metal oxide-reactive functionalized group on a functionalized organic polymer material with an activated metal oxide.

5. An inkjet receiver as claimed in claim 4, wherein the metal oxide-reactive functionalized group comprises a silicon hydroxide terminal moiety.

6. An inkjet receiver as claimed in claim 1, wherein the oligomeric or polymeric metal oxide is an acid-catalysed silica polymer.

7. An inkjet receiver as claimed in claim 1, wherein the outer portion or shell is present in an amount of from 10% to 40% by weight of the composite particle.

8. An inkjet receiver comprising a support and one or more layers coated on the support, at least one of which comprises a particulate material and a binder, the particulate material comprising composite particles having an inner portion and an outer portion, wherein the inner portion comprises an organic polymer material comprising latex particles selected from a functionalized latex, and the outer portion comprises an inorganic material having enhanced keeping properties, the particulate material comprising core-shell particles, the core-shell particles having:
   a core comprising an organic polymer comprising a functionalized latex; and
   a shell comprising an oligomeric or polymeric metal oxide, the oligomeric or polymeric metal oxide being covalently bound to the latex material via a linker group, the core-shell particles being obtainable by reacting a functionalized latex with a metal oxide in the presence of a metal oxide polymerization catalyst.

9. An inkjet receiver as claimed in claim 8, wherein the outer portion or shell is present in an amount of from 10% to 40% by weight of the composite particle.

10. A method of manufacturing an inkjet receiver, the method comprising providing a support and coating at least one layer of a coating composition onto the support and drying the coated support, said composition comprising a dispersion of a particulate material and a binder in a coating medium, the particulate material comprising composite particles having an inner portion and an outer portion, wherein said inner portion comprises an organic polymer material comprising latex particles selected from a functionalized latex, and said outer portion comprises an inorganic material having enhanced keeping properties, wherein the composite particles are core-shell particles where the inner portion is the core and the outer portion is the shell, the core-shell particles comprising a core comprising an organic polymer which is a functionalized latex, and a shell comprising an oligomeric or polymeric metal oxide, the oligomeric or polymeric metal oxide being covalently bound to the latex via a linker group.

11. A method of printing, which comprises the steps of:
   (a) providing an inkjet printer that is responsive to digital data signals;
   (b) loading the inkjet printer with an inkjet receiver comprising a support and one or more layers coated on said support, at least one of which comprises a particulate material and a binder, said particulate material comprising composite particles having an inner portion and an outer portion, wherein said inner portion comprises an organic polymer material comprising latex particles selected from a functionalized latex, and said outer portion comprises an inorganic material having enhanced keeping properties, wherein the composite particles are core-shell particles where the inner portion is the core and the outer portion is the shell, the core-shell particles comprising a core comprising an organic polymer which is a functionalized latex, and a shell comprising an oligomeric or polymeric metal oxide, the oligomeric or polymeric metal oxide being covalently bound to the latex via a linker group;
   (c) loading the inkjet printer with a inkjet ink; and
   (d) printing on the inkjet receiver using the inkjet ink in response to digital data signals.

12. A method of printing as claimed in claim 11, wherein the outer portion or shell is present in an amount of from 10% to 40% by weight of the composite particle.

* * * * *